United States Patent Office 3,278,452
Patented Oct. 11, 1966

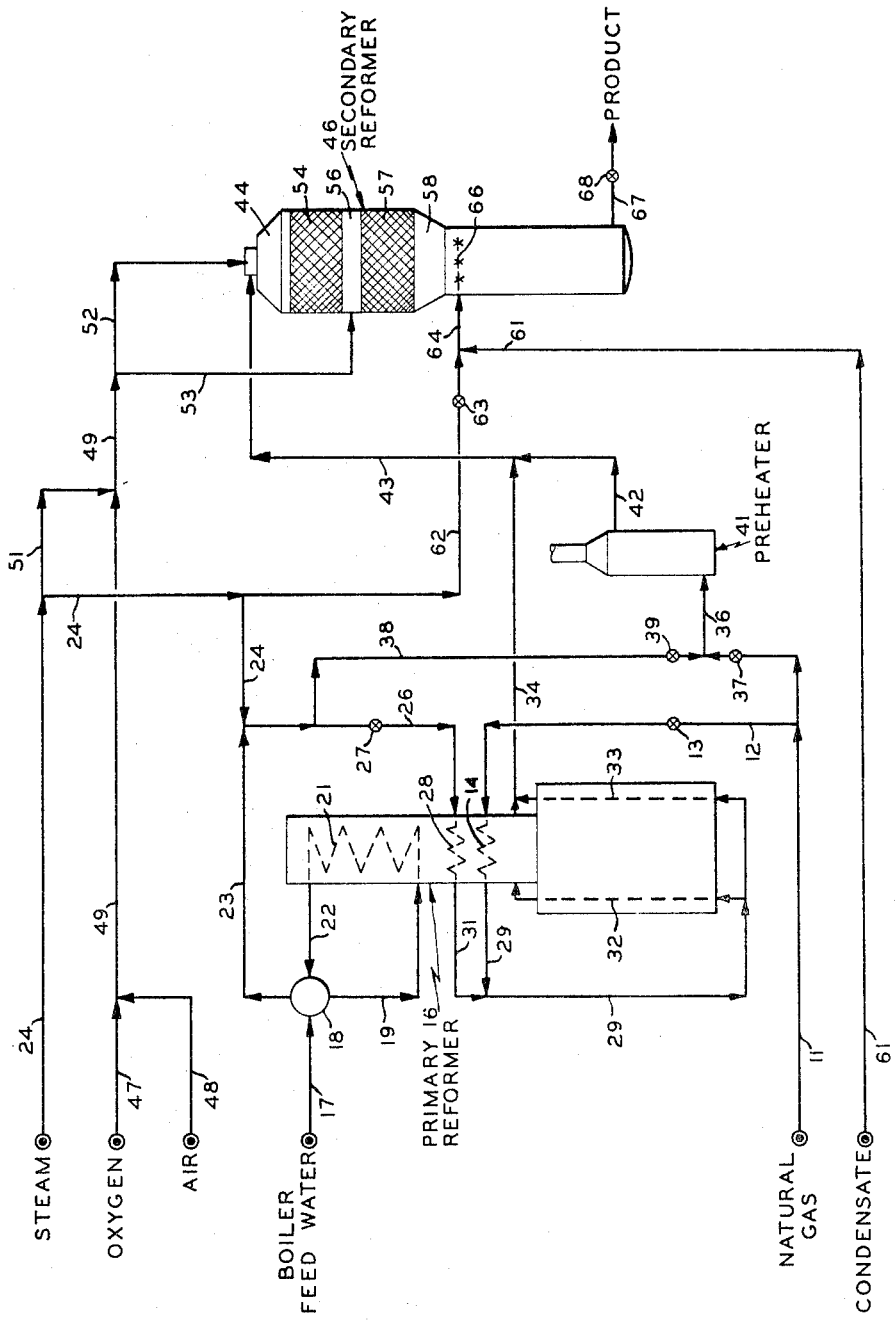

3,278,452
PRODUCTION OF HYDROGEN-CONTAINING
GASES
Donald A. Vorum, Madison, N.J., assignor to Pullman
Incorporated, a corporation of Delaware
Filed Dec. 24, 1959, Ser. No. 861,982
9 Claims. (Cl. 252—376)

This invention relates to the production of hydrogen and related substances from hydrocarbons. It is particularly applicable to the conversion of hydrocarbons in the production of hydrogen-containing synthesis gas, such as ammonia synthesis gas.

Substantial demand exists for hydrogen because of its utility in a number of chemical processes such as the hydrogenation of fats and oils and the synthesis of ammonia, methanol, gasoline, and the like. Hydrocarbons such as natural gas and petroleum form an abundant source of hydrogen and related substances, such as carbon monoxide. A number of processes are used for the conversion of hydrocarbons to hydrogen, the principal ones involving partial oxidation, reforming with steam, and combinations of the two. Combination processes possess certain advantages over either partial oxidation or steam reforming alone. These advantages are best explained in terms of the reactions which are generally believed to represent partial-oxidation and steam-reforming processes and which, for purposes of illustration, are listed below.

(1) $CH_4 + \frac{1}{2} O_2 = CO + 2H_2 + \text{heat}$
(2) $CH_4 + O_2 = CO_2 + 2H_2 + \text{heat}$
(3) $H_2 + \frac{1}{2} O_2 = H_2O + \text{heat}$
(4) $CH_4 + H_2O + \text{heat} = CO + 3H_2$
(5) $CH_4 + CO_2 + \text{heat} = 2CO + 2H_2$
(6) $CO + H_2O = CO_2 + H_2 + \text{heat}$ Methane has been shown as the hydrocarbon reactant, but it should be understood that similar reactions occur with heavier hydrocarbons. Reactions (1), (2) and (3) are typical of a partial-oxidation process for the conversion of hydrocarbons to hydrogen and show the highly exothermic nature of such a process. Reactions (4) and (5) are typical of a steam-reforming process for a similar conversion and show the highly endothermic nature of such a process. Reaction (6), the "water-gas shift" represents a balancing of the product constituents. Reactions (1) through (5) are most advantageously carried out at elevated temperatures, between about 1100° F. and about 2800° F. and preferably above about 1300° F. because outside of either extreme objectionable fouling of catalysts and equipment may occur, presumably as the result of decomposition of hydrocarbons, forming carbon and/or carbonaceous material. The upper temperature limit is also influenced by the difficulties and economics of obtaining materials of construction which will withstand significantly higher temperatures. In this regard, at temperatures in excess of about 2500° F., it is usually necessary to provide internal insulation and water-cooling for structural elements inside the conversion zone. Above about 2800° F., even these expedients may not suffice to maintain the necessary strength of structural materials which can be economically used. Furthermore, reforming catalysts are observed to suffer substantial loss of activity at unduly elevated temperatures. On the one hand, then, partial-oxidation processes, which may operate at temperatures in excess of 3000° F., may have certain disadvantages in requiring costly materials of construction, high oxygen consumption, and provisions for removal of carbon and/or carbonaceous materials formed. Steam-reforming processes, on the other hand, have a limited range of utility because of feed requirements and the high cost of fuel necessary to heat the hydrocarbons and steam to reaction temperatures and to supply the endothermic heat of reaction. Combined partial-oxidation and steam-reforming processes, however, have advantages over either process alone by virtue of utilizing heat evolved in partial oxidation to supply at least a part of the heat required for steam-reforming, thereby cutting fuel costs and permitting operation with feeds containing relatively large amounts of hydrocarbons.

While the combination process has gained substantial commercial acceptance, it too has some limitations. In the combination process the reactant hydrocarbons, steam and air, oxygen, or oxygen-enriched air are introduced and commingled close to a bed of reforming catalyst such that these reactant materials come into almost immediate contact with reforming catalyst. In the catalyst bed, partial-oxidation and steam-reforming reactions occur, with the exothermic heat of the former supplying energy for the endothermic heat of the latter. Unfortunately, the exothermic reactions are very rapid, and may predominate near the inlet side of the catalyst bed so that relatively high temperatures are noted here with a sharp fall off to relatively low temperatures at the outlet side of the bed, where endothermic reactions evidently predominate. In view of this markedly non-isothermal temperature profile and the temperature limitations discussed above, it is evident that the simple combination process may be limited to a relatively narrow range of conversions. In this regard, it is possible to convert a feed hydrocarbon stream containing about 25 percent methane equivalent in such a process to an effluent stream containing about five percent methane equivalent without operating outside of either temperature limit. The expression "percent methane equivalent" as used herein means mol percent of hydrocarbons expressed as methane, on a dry basis, e.g., ten mol percent ethane is 20 percent methane equivalent. Likewise, it is possible to convert a stream containing about ten percent methane equivalent to one of less than one percent methane equivalent. But if it were desired to convert the 25 percent stream to an effluent containing less than one percent, it would be necessary to supply so much additional oxygen to be burned to provide heat for reforming that the temperatures on the inlet side of the catalyst bed would be excessive. As a practical matter, the combination process of the prior art has almost the same high temperature problems as conventional partial oxidation where extensive conversion of hydrocarbons is required, as in the case just described. If an effluent containing a few tenths of a percent methane equivalent is assumed as is required, for example, in the preparation of suitable ammonia synthesis gas, the combination process of the prior art is usually efficient only with feeds containing less than about 20 percent methane equivalent.

It is an object of this invention to provide a process for the production of hydrogen from hydrocarbons.

Another object of the invention is to provide a process for the production of hydrogen from a hydrocarbon stream where the concentration of hydrocarbons in the stream is relatively high.

Still another object of the invention is to provide a process as above by a combination of partial-combustion and steam-reforming where the combined process is carried out at relatively isothermal conditions.

A further object of the invention is to provide a high degree of temperature control to a process for the production of hydrogen from hydrocarbons.

A still further object of the invention is to provide apparatus suitable for conducting the process of the invention.

Other objects and advantages of the invention will appear from the detailed description and discussion which follows.

The above objects are accomplished in accordance with the invention by the process which comprises introducing an oxygen-containing stream, steam, and hydrocarbons into a first conversion zone containing reforming catalyst wherein a portion of the hydrocarbons are burned and reformed, producing hydrogen. Products of the first conversion zone are passed to a second conversion zone containing reforming catalyst where a still further portion of the hydrocarbons is converted to hydrogen by a combination of partial oxidation and reforming. This last conversion is accomplished by introducing another oxygen-containing stream between the first and second conversion zones. Additional conversion zones are provided, each containing reforming catalyst. Hydrocarbons pass through successive conversion zones arranged in series with introduction of additional oxygen between each of the succession of zones such that further portions of hydrocarbons are converted in each zone to hydrogen by a combination of partial oxidation and reforming. The total number of conversion zones is that necessary to achieve the desired degree of hydrocarbon conversion. Careful observance of the critical operating conditions described below will result in a need for only two conversion zones in almost all instances. Of course, additional conversion zones may be used and are contemplated by the invention, but it is preferred to operate so as to require just two zones.

The feed to the process of the invention may be any vaporized hydrocarbon or mixture of hydrocarbons. Thus, it is possible to achieve hydrogen production from hydrocarbon feeds as light as natural gas and as heavy as a vaporized catalytic cycle oil with a molecular weight of about 250. Substantially heavier hydrocarbons are only difficulty treated in accordance with the invention because of the difficulty of satisfactorily vaporizing them. The process is useful with feeds containing any given concentration of hydrocarbons, but the invention is preferably used and has the greatest advantage with feeds containing hydrocarbons in excess of about fifteen percent methane equivalent.

The advantages of multizone conversion with betweenzone oxygen introduction are obtained, in accordance with the invention, by careful observance of certain critical temperatures and concentrations of reactants. Steam must always be present in a molar ratio to hydrocarbon expressed as methane equivalent in excess of about 1.0:1. Substantially higher ratios can be used and are desirable from the standpoint of driving the equilibrium of reforming reactions toward the production of hydrogen and carbon monoxide. The upper limit of steam-to-methane equivalent ratio is influenced by the cost of steam, oxygen, and the effect of increasing equipment size. The steam is believed to function both in suppressing decomposition of hydrocarbon to carbon and in supplying water for the reforming reactions. The amount of oxygen introduced just before each of the succession of conversion zones should be such that resulting maximum temperatures in the zones do not exceed about 2800° F., lest materials of construction and the conversion reactions possibly be adversely affected. At the same time sufficient oxygen should be supplied to provide enough heat through partial combustion to raise the temperature of the reactants to the elevated temperatures consistent with efficient conversion and to provide enough heat at these elevated temperatures to sustain substantial endothermic reforming. Accordingly, oxygen is provided before each of the succession of conversion zones to maintain the same at a maximum temperature between about 2000° F. and about 2800° F., preferably between about 2200° F. and about 2500° F. Operation at lower maximum temperatures is feasible but inefficient. A further consideration involved in the amount of the oxygen-containing stream arises from the frequent application of the invention to the production of ammonia synthesis gas. In this connection the hydrogen obtained from the process of the invention is usually augmented by hydrogen produced in a subsequent water-gas shift reaction where the carbon monoxide in the effluent from the instant process is shifted with steam to form hydrogen and carbon dioxide according to Equation 6 above. The oxygen-containing streams introduced to the instant process when part of a process for the production of ammonia synthesis gas, then, should contain sufficient nitrogen to yield, after water-gas shift, a molar ratio of three to one, hydrogen to nitrogen.

It will frequently be desirable to have some steam in the oxygen-containing streams introduced before each of the conversion zones. This steam is principally supplied for safety reasons since it prevents the presence of explosive oxygen-hydrocarbon mixtures in the oxygen-introduction system, which mixtures otherwise could be present should for some reason the oxygen supply be blocked off. In the case of steam addition as just described, steam should constitute between about 10 and about 30 mol percent of each of the oxygen-containing streams. In some instances, steam introduced in this fashion also provides conveniently a reactant to the process in addition to the amount of steam introduced in other ways to provide the requirements of the process.

In each of the plurality of conversion zones, any one or a plurality of available reforming catalysts can be used to increase the rate of the reforming reactions. Suitable catalysts are, for example, a metal of group VIII having an atomic number not greater than 28 and/or an oxide thereof, a metal of a left-hand element of group VI and/or an oxide thereof. Specific examples of reforming catalysts which can be used are nickel, nickel oxide, cobalt, cobalt oxide, chromia, molybdenum oxide, etc. These have been named substantially in order of decreasing reforming severity, i.e., activity. Where two or more catalysts are used in a given conversion zone, these should be arranged so that the reactants contact the catalysts in order of increasing catalyst activity. In this way, the initial reforming is relatively mild and it is observed that carbon formation is thereby minimized. Catalyst volume in each of the conversion zones is adjusted to enable substantial reforming to take place but the volume must not be so great as to cause so much reforming that the temperature drops below about 1100° F. and preferably not below about 1300° F., i.e., to where carbon formation might result. Catalyst volumes are preferably such that minimum temperatures in each of the conversion zones are between about 1300° F. and 2000° F. The reforming catalysts used are characterised by the amount of reforming which they will cause to take place with a given feed under suitable reforming conditions. These characteristic amounts are expressed as space velocities, that is, volume of hydrogen and carbon monoxide produced (ideal gas volumes expressed at standard conditions) per hour per unit volume of catalyst. Space velocities by this definition are preferably above about 2,000 v./hr./v. in all but the last conversion zone where they are between about 300 and about 400 v./hr./v.

Since the concentration of hydrocarbons decreases progressively as the gases pass through conversion zones, it is frequently desirable to provide greater reaction time for the hydrocarbons in successive zones by progressively increasing the volume of reforming catalyst therein. In any case as aforesaid, the volume of reforming catalyst in any bed should be maintained no larger than would produce an effluent gas temperature of about 1100° F., preferably above about 1300° F. Thus, for example, in a process requiring two conversion zones, the volume of reforming catalyst in the second zone preferably stands in the ratio of about 2 to 1 with respect to the volume of reforming catalyst in the first zone.

The manner in which the reactants are introduced into each conversion zone is of great importance. The oxygen and hydrocarbon reactants must be introduced at high velocities, mixed and injected rapidly into the bed of reforming catalyst so as to preclude any partial combustion outside of the bed of reforming catalyst. Only in this way is exothermic heat of partial combustion quickly taken up as endothermic heat in steam reforming and local high temperatures avoided. As aforesaid, such local high temperatures may have several adverse effects: carbon formation, heat damage to structural elements, and heat damage to catalyst.

Hydrocarbon-containing gases pass through successive conversion zones with oxygen introduction between each until the desired conversion is accomplished. By careful control of the amount of oxygen introduced before each zone and the amount of reforming catalysts in each zone, desirable near-isothermal conditions are maintained and efficient conversion without either excessive carbon formation or use of expensive materials of construction is obtained.

The problems of carbon formation, which are always present in any process for the production of hydrogen by the conversion of hydrocarbons, increase with the molecular weight of the hydrocarbons in the feed. Thus, methane, being highly refractory, is converted to hydrogen without much difficulty from the carbon-formation standpoint. However, as the molecular weight of the hydrocarbons present in the feed increases, refractoriness decreases, and it is necessary to take steps to avoid carbon formation. Up to a point this may be done by increasing the ratio of steam to methane equivalent. This single expedient is effective in avoiding carbon formation with hydrocarbons as heavy as light petroleum naphthas. Another expedient is also useful, particularly with hydrocarbons heavier than light naphthas: this expedient involves recycle of a portion of the hydrogen-rich product gas from the instant process. In this way concentrations of reactants are biased to favor reversal of the reaction in which hydrocarbon decomposes to elemental carbon and hydrogen. Hydrogen recycle, as described, is useful in combination with steam over the full range of hydrocarbons being converted. The relative proportions of steam and hydrogen recycle which are used, when the latter is used at all, are matters of engineering practice and economics.

The foregoing process can be practiced at any desired pressure. In general, superatmospheric pressures are preferred not only because of the obvious difficulties attending use of subatmospheric pressure but because the product hydrogen is often subsequently used in high pressure synthetic processes. Substantial savings in subsequent compression cost are thus effected by operating the process of the invention at substantial superatmospheric pressures. The use of extremely high superatmospheric pressures is generally avoided in view of greater equipment cost and the adverse effect on the equilibrium of desired reactions wherein volume expansions take place. The choice of a particular operating pressure will be influenced by the particular application of the invention.

For a detailed discussion and description of the invention and an example of its application, reference is now had to the accompanying drawing which is a diagrammatic illustration in elevation of apparatus suited to practice one embodiment of the invention.

In the drawing 9844 pounds per hour of natural gas is introduced as feed to the process through conduit 11. The natural gas feed is at about 280 p.s.i.g. and 100° F. and has the composition shown in Table I below.

TABLE I

*Natural gas feed in conduit 11*

| Component: | Mol percent |
| --- | --- |
| $N_2$ | 3.8 |
| $CH_2$ | 92.6 |
| $C_2H_6$ | 1.6 |
| $C_3H_8$ | 1.1 |
| $C_4H_{10}$ | 0.5 |
| $C_5H_{12}$ | 0.2 |
| $C_6H_{14}$ | 0.2 |
| | 100.0 |

4,880 pounds per hour of the natural gas is passed through conduit 12 with valve 13 to preheating coil 14 in the convection section of primary reforming furnace 16 wherein the natural gas is indirectly heated by hot flue gases. Steam for reforming is generated also in the convection section of furnace 16. Thus, boiler feed water is introduced through conduit 17 to a steam drum 18. Water passes from drum 18 through conduit 19 to coil 21 in the convection section of furnace 16 wherein the water is boiled by indirect heat exchange with hot flue gases. Steam and water pass from coil 21 through conduit 22 and are returned to drum 18. Steam for reforming is withdrawn from drum 18 through conduit 23 and conduit 26 with valve 27 and passes at a rate of 11,700 pounds per hour to coil 28 in furnace 16 for further preheating. Preheated natural gas from coil 14 is withdrawn through conduit 29 and combined with preheated steam withdrawn from coil 28 through conduit 31. The natural gas-steam mixture now at 800° F. passes in conduit 29 to a plurality of tubes, indicated as 32 and 33, in the radiant section of reforming furnace 16. The plurality of tubes, indicated as 32 and 33, contain nickel reforming catalyst. Furnace 16 is a conventional fuel-fired furnace. The natural gas-steam mixture flowing through the tubes is indirectly heated to about 1400° F. thereby causing reaction of part of the hydrocarbons with steam to produce hydrogen. The partially reformed natural gas is withdrawn from furnace 16 through conduit 34.

The other portion of natural gas introduced through conduit 11 is withdrawn through conduit 36 with valve 37 and passed after the addition of 6250 pounds per hour of steam to preheating furance 41. Steam added to natural gas in conduit 36 is obtained in part from that generated in furnace coil 21 and in part from an extraneous steam source. Extraneous steam is introduced through conduit 34 and combined with steam in conduit 23. Steam for the portion of natural gas passed in conduit 36 to furnace 41 is withdrawn from conduit 23 through conduit 38 with valve 39 and combined with natural gas in conduit 36. The natural gas-steam mixture is preheated to about 1000° F. in furnace 41 by indirect heat exchange with hot flue gases generated therein.

The hydrocarbon-containing effluents of furnaces 41 and 16 now at about 137 p.s.i.g. are passed respectively through conduits 42 and 34, combined, and passed in conduit 43 at about 1240° F. to a first gas mixing zone 44 located in the upper portion of secondary reforming vessel 46 and just above a first reforming zone 54. The composition of the stream flowing in conduit 43 to first gas mixing zone 44 of vessel 46 is shown in Table II below.

TABLE II

*Feed to secondary reforming vessel 46 in conduit 43*

| Component: | Mol percent |
|---|---|
| $H_2$ | 29.7 |
| $N_2$ | 1.1 |
| CO | 4.7 |
| $CO_2$ | 4.1 |
| $H_2O$ | 39.7 |
| $CH_4$ | 20.1 |
| $C_2H_6$ | 0.2 |
| $C_3H_8$ | 0.2 |
| $C_4H_{10}$ | 0.1 |
| $C_5H_{12}$, $C_6H_{14}$ | 0.1 |
| | 100.0 |

Thus, the feed to vessel 46 contains about 36.5 percent methane equivalent, the molar ratio of oxygen to methane equivalent is 0.42 while that of steam to methane equivalent is 2.05. The oxygen requirements of first gas mixing zone 44 are supplied by combining 4,798 pounds per hour of oxygen passed from a source in conduit 47 and 19,661 pounds per hour of air received from a source through conduit 48 and passing the combined oxygen-air stream through conduits 49 and 52 to gas distribution means (not shown) in first gas mixing zone 44. The gas distribution means in this example include a perforated ring disposed in zone 44 such that the oxygen-enriched air is thoroughly mixed with incoming hydrocarbon feed from conduit 43.

Oxygen-enriched air flowing in conduit 49 is admixed with 2730 pounds per hour of steam withdrawn from conduit 24 through conduit 51. This steam comprises about 18 mol percent of the oxygen-enriched air stream and thereby provides an effective sweep gas for preventing the presence of explosive oxygen-hydrocarbon mixtures in conduits 49, 52 and 53 should for some reason the oxygen supply be blocked off. Total gases introduced to first gas-mixing zone 44 through conduit 52 are at a rate of 16,333 pounds per hour.

The thoroughly mixed gases of zone 44 pass immediately into a bed of reforming catalyst located in first reforming zone 54 wherein partial oxidation and reforming reactions occur producing hydrogen and carbon monoxide. Gas-mixing zone 44 and reforming zone 54 constitute a first conversion zone or stage. The maximum temperature in first reforming zone 54 is somewhat below 2420° F., which is the hypothetical flame temperature calculated by assuming instantaneous reaction of all the oxygen present to produce carbon dioxide and steam with total heat of reaction being absorbed as sensible heat by the products of the reaction. The first reforming zone 54 contains 200 cubic feet of reforming catalyst which consists of 60 cubic feet of chromia catalyst and 140 cubic feet of nickel catalyst. These catalysts are supported on an arch dome built of refractory bricks with the chromia catalyst resting on top of the nickel catalyst. This arrangement of reforming catalyst whereby the reactant gases pass successively over catalyst of increasing reforming activity reduces carbon formation attendant to the reforming reactions. The space velocity in first reforming zone 54 is about 2000 v./hr./v. Gases passing through first reforming zone 54 are substantially reformed and thereby suffer a marked temperature drop such that the temperature at the bottom of reforming zone 54 has dropped to about 1610° F. The composition of the effluent from first reforming zone 54 now containing about 8.2 percent methane equivalent is shown in Table III below.

TABLE III

*Effluent from first reforming zone 54*

| Component: | Mol percent |
|---|---|
| $H_2$ | 36.9 |
| $N_2$ | 12.1 |
| A | 0.2 |
| CO | 9.0 |
| $CO_2$ | 5.9 |
| $CH_4$ | 5.7 |
| $H_2O$ | 30.2 |
| | 100.0 |

The partially converted gases of first reforming zone 54 are passed to a second gas mixing zone 56 also located in vessel 46 just above second reforming zone 57. Additional oxygen is introduced to second gas mixing zone 56 through conduit 53 and is in such quantity as to burn hydrogen and/or hydrocarbons and produce a calculated hypothetical flame temperature of about 2265° F. Again, the actual maximum temperature in second reforming zone 57 is somewhat lower. The oxygen stream introduced to the second gas mixing zone 56 is distributed by means of nozzles (not shown) so located and designed to enable thorough mixing of the additional oxygen with the effluent of first reforming zone 54. Total flow in conduit 53 is 10,856 pounds per hour. The molar ratio of oxygen to methane equivalent in the feed to second reforming zone 57 is 0.71 while that of steam to methane equivalent is 5.7.

The thoroughly mixed gases of second gas mixing zone 56 pass immediately into contact with reforming catalyst in second reforming zone 57 also located in vessel 46. The second reforming zone 57 contains 400 cubic feet of reforming catalyst which consists of 40 cubic feet of chromia catalyst and 360 cubic feet of nickel catalyst. This catalyst is supported on an arch dome of refractory brick in substantially the same fashion as is the catalyst in first reforming zone 54. Again, the chromia catalyst rests atop the nickel catalyst so that reactant gases pass successively over catalyst of increasing reforming activity. The space velocity in second reforming zone 57 is about 300 v./hr./v. Gas mixing zone 56 and reforming zone 57 constitute a second conversion zone or stage. Reforming in zone 57 accomplishes substantially complete conversion of the hydrocarbons. The effluent from zone 57 now at 1760° F. contains less than about 0.3 percent methane equivalent and has the composition shown in Table IV below:

TABLE IV

*Effluent from second reforming zone 57*

| Component: | Mol percent |
|---|---|
| $H_2$ | 38.2 |
| $N_2$ | 16.2 |
| A | 0.3 |
| CO | 11.6 |
| $CO_2$ | 5.3 |
| $CH_4$ | 0.1 |
| $H_2O$ | 28.3 |
| | 100.0 |

In order to fix the composition of the effluent from reforming zone 57 the gases are shock cooled with hot quench water introduced through conduit 64 to distributing means 66 disposed in quench zone 58 of vessel 46. The aforesaid quench water is obtained by combining 26,430 pounds per hour of condensate from an outside source and passing the same in conduit 61 with 7,300 pounds per hour of steam withdrawn from conduit 24 through conduit 62 and valve 63. Quenched effluent from zone 58 now at a temperature of 670° F. is withdrawn through conduit 67 with valve 68 as product at a rate of 88,713 pounds per hour.

This reformed product containing substantially no hydrocarbons and a high concentration of hydrogen may be processed subsequently in any desired way but in the more usual applications of the invention this product will be passed to shift conversion for production of additional hydrogen, then to an acid gas removal process and finally to the synthesis process for which the hydrogen is made.

In the foregoing example calculated hypothetical flame temperatures were used as the maximum temperatures in the reforming zones 54 and 57 and it was noted that actual maximum temperatures are somewhat lower. The calculated hypothetical flame temperatures are the maximum attainable temperatures and thus must be used as the minimum design bases for the structures and catalyst.

The feed to secondary reforming vessel 46 is at about 1240° F., as mentioned. Preheat to temperatures between about 600° F. and about 1400° F. is preferred because it reduces the time required for the hydrocarbons to reach temperatures in excess of about 2000° F. in first reforming zone 54. It has been found that this time should be kept as short as possible because of carbon-formation tendencies in the interim. Primary reforming furnace 16 and preheating furnace 41 accomplish desired preheating of feed to secondary reforming vessel 46.

The process of this particular example is a part of a process for the production of ammonia synthesis gas. The example illustrates one way in which the invention is used profitably in combination with other processes. In this connection, a limited supply of oxygen is available to the process. Accordingly, some reforming is accomplished in the primary reforming furnace 16 with the remaining, still extensive, reforming accomplished with partial oxidation in secondary reforming vessel 46. The oxygen available for the latter is augmented by the air necessary to supply the nitrogen requirements of subsequent ammonia synthesis. Thus, the process of the invention is well suited to be combined with other processes, the combination making efficient use of available raw materials and reducing overall costs of fuel and utilities. The process of the invention is equally adapted to performing substantially complete conversion of natural gas in conduit 11 to product in conduit 67, but to do so would require additional oxygen probably from a separate air-separation plant. The cost of such a plant is avoided by use of primary reforming furnace 46 which, as a preheat furnace, must be used in any case to provide desired preheat to the feed to secondary reforming vessel 46.

Using the process of the prior art where oxygen is mixed with hydrocarbon and passed to a single bed of reforming catalyst, it is theoretically possible to accomplish the conversion of the foregoing example, i.e., from about 36.5 percent to about 0.3 percent methane equivalent. Using the same amount of steam as in the example, the prior art process requires so much oxygen to supply heat to the reforming reactions, however, that the calculated hypothetical flame temperature is about 3400° F. Thus, the maximum temperature at the inlet side of the catalyst bed would be nearly 3400° F. No known reforming catalyst would remain active at such a temperature. Furthermore, special materials of construction would be required and problems of carbon formation would probably follow.

As can be seen from the foregoing, the invention provides an efficient and economical process for converting hydrocarbons of any given initial concentration to hydrogen whereby extremes of temperature are avoided, the process being carried out under relatively isothermal conditions. Out of this sort of improved temperature control obtained by stagewise introduction of oxygen flow a number of advantages including eased requirements for materials of construction and relatively low fuel and utilities requirements. In addition to these features, the invention reduces undesirable "wall effects" of the prior art whereby some reactants remain unconverted due to bypassing of the catalyst bed. Stagewise oxygen introduction accomplishes remixing of reactants between catalyst beds and thereby enables extremely high conversions.

The invention can be practiced in any suitable apparatus. Thus, separate vessels can be used for each of the conversion zones with piping linking the separate vessels. It is preferred, however, to eliminate as much costly piping as possible. Thus, it will almost always be desirable to combine at least two conversion zones in a single vessel as in vertical vessel 46 of the example, thereby practically eliminating high-temperature piping. These savings are further enhanced by including a quench zone, such as 58, as a part of the conversion vessel, so that the product gases can be transported in relatively low-temperature, inexpensive piping. In any case, it will always be desirable to locate the gas-mixing zone and reforming zone of a given conversion zone or stage next to or forming a part of one another, in a single vessel, so that the exothermic heat of partial combustion will be quickly taken up in endothermic heat of reforming.

Various changes may be made in the details of operation as well as in the construction of the apparatus without departing from the invention or sacrificing the advantages thereof. It is understood that the invention is to be limited only by the scope of the appended claims.

What is claimed is:

1. A method of producing ammonia synthesis gas in a multizone conversion process by partial combustion and catalytic steam reforming of hydrocarbons which comprises: passing a mixture of steam and vaporous hydrocarbons at an initial temperature between about 600° F. and about 1400° F. through a succession of conversion zones, each of said conversion zones consisting essentially of a gas mixing zone and a catalytic reforming zone containing a bed of reforming catalyst, introducing an oxygen-nitrogen mixture into each of said gas mixing zones, injecting mixed reactants of each of said gas mixing zones into its respective catalytic reforming zone at a rate sufficient to preclude partial combustion outside of the bed of reforming catalyst, maintaining each of said catalytic reforming zones at a maximum temperature between about 2000° F. and about 2800° F. and a minimum temperature between about 1100° F. and about 2000° F. by controlling the amount of oxygen-nitrogen mixture introduced into each of said gas mixing zones and the volume of reforming catalyst in each of said beds of reforming catalyst, controlling the proportion of nitrogen present in said oxygen-nitrogen mixture so as to provide only enough nitrogen as required by subsequent ammonia synthesis, thereby converting a substantial portion of said hydrocarbons to hydrogen in each of said conversion zones and producing a gas useful, without further addition of nitrogen, in the production of ammonia synthesis gas.

2. A multizone conversion process for the production of hydrogen by partial combustion and catalytic steam reforming of hydrocarbons which comprises: passing a mixture of steam and vaporous hydrocarbons at an initial temperature between about 600° F. and about 1400° F. through a succession of conversion zones, each of said conversion zones consisting essentially of a gas mixing zone and a catalytic reforming zone containing a bed of reforming catalyst, introducing oxygen into each of said gas mixing zones, injecting mixed reactants of each of said gas mixing zones into its respective catalytic reforming zone at a rate sufficient to preclude partial combustion outside of the bed of reforming catalyst, and maintaining each of said catalytic reforming zones at a maximum temperature between about 2000° F. and about 2800° F. and a minimum temperature between about 1100° F. and about 2000° F. by controlling the amount of oxygen introduced into each of said gas mixing zones and the volume of reforming catalyst in each of said beds of reforming catalyst, so as to convert a substantial portion of said hydrocarbons to hydrogen in each of said conversion zones.

3. A multizone conversion process for the production of hydrogen by partial combustion and catalytic steam reforming of hydrocarbons which comprises: passing a mixture of steam and vaporous hydrocarbons at an initial temperature between about 600° F. and about 1400° F. through a succession of conversion zones, each of said conversion zones consisting essentially of a gas mixing zone and a catalytic reforming zone containing a bed of reforming catalyst, introducing oxygen into each of said gas mixing zones, injecting mixed reactants of each of said gas mixing zones into its respective catalytic reforming zone at a rate sufficient to preclude partial combustion outside of the bed of reforming catalyst, maintaining at least two reforming catalysts as the bed of reforming catalyst in the catalytic reforming zone of at least the first of said succession of conversion zones, said two reforming catalysts having differing reforming activity and being arranged so as to be contacted by said mixture and oxygen in order of increasing reforming activity, and maintaining each of said catalytic reforming zones at a maximum temperature between about 2000° F. and about 2800° F. and a minimum temperature between about 1100° F. and about 2000° F. by controlling the amount of oxygen introduced into each of said gas mixing zones and the amount of reforming catalyst in each of said beds of reforming catalyst, so as to convert a substantial portion of said hydrocarbons to hydrogen in each of said conversion zones.

4. A multizone conversion process for the production of hydrogen by partial combustion and catalytic steam reforming of hydrocarbons which comprises: passing a mixture of steam and vaporous hydrocarbons at an initial temperature between about 600° F. and about 1400° F. through a succession of conversion zones, each of said conversion zones consisting essentially of a gas mixing zone and a catalytic reforming zone containing a bed of reforming catalyst, introducing oxygen into said gas mixing zones, injecting mixed reactants of each of said gas mixing zones into its respective catalytic reforming zone at a rate sufficient to preclude partial combustion outside of the bed of reforming catalyst, and maintaining each of said catalytic reforming zones at a maximum temperature between about 2200° F. and about 2500° F. and a minimum temperature between 1300° F. and about 2000° F. by controlling the amount of oxygen introduced into each of said gas mixing zones and the volume of catalyst in each of said beds of reforming catalyst, so as to convert a substantial portion of said hydrocarbons to hydrogen in each of said conversion zones.

5. A multizone conversion process for the production of hydrogen by partial combustion and catalytic steam reforming of hydrocarbons which comprises: passing a mixture of steam and vaporous hydrocarbons at an initial temperature between about 600° F. and about 1400° F. and an initial hydrocarbon concentration in excess of about 15 percent methane equivalent successively through two conversion zones, each of said conversion zones consisting essentially of a gas mixing zone and a catalytic reforming zone containing a bed of reforming catalyst, introducing oxygen into each of said gas mixing zones, injecting mixed reactants of each of said gas mixing zones into its respective catalytic reforming zone at a rate sufficient to preclude partial combustion outside of the bed of reforming catalyst, and maintaining each of said catalytic reforming zones at a maximum temperature between about 2000° F. and about 2800° F. and a minimum temperature between about 1100° F. and about 2000° F. by controlling the amount of oxygen introduced into each of said gas mixing zones and the volume of reforming catalyst in each of said beds of reforming catalyst, so as to convert said mixture to a gas containing hydrocarbons of less than about 15 percent methane equivalent after said first conversion zone and so as to convert a substantial portion of said hydrocarbons to hydrogen in said second conversion zone.

6. The process of claim 5 where the volume of the bed of reforming catalyst in the catalytic reforming zone of the second conversion zone is about twice that in the catalytic reforming zone of the first conversion zone.

7. In the production of ammonia synthesis gas by catalytic steam reforming and partial combustion, the process which comprises contacting a mixture of steam and vaporous hydrocarbons with reforming catalyst maintained at a temperature between about 600° F. and about 1400° F. to convert a portion of said hydrocarbons to hydrogen, passing products of said contacting through a succession of conversion zones, said products containing hydrocarbons in excess of about 15 percent methane equivalent, each of said conversion zones consisting essentially of a gas mixing zone and a catalytic reforming zone containing a bed of reforming catalyst, introducing an oxygen-nitrogen mixture into each of said gas mixing zones, injecting mixed reactants of each of said gas mixing zones into its respective catalytic reforming zone at a rate sufficient to preclude partial combustion outside of the bed of reforming catalyst, maintaining each of said catalytic reforming zones at a maximum temperature between about 2000° F. and about 2800° F. and a minimum temperature between about 1100° F. and about 2000° F. by controlling the amount of oxygen-nitrogen mixture introduced into each of said gas mixing zones and the volume of reforming catalyst in each of said beds of reforming catalyst, controlling the proportion of nitrogen present in said oxygen-nitrogen mixture so as to provide only enough nitrogen as required by subsequent ammonia synthesis, thereby converting substantially all of said hydrocarbons to hydrogen and converting a substantial portion of said hydrocarbons to hydrogen in each of said conversion zones and producing a gas useful, without further addition of nitrogen, in the production of ammonia synthesis gas.

8. In the production of ammonia synthesis gas by catalytic steam reforming and partial combustion, the process which comprises contacting a mixture of steam and vaporous hydrocarbons with reforming catalyst maintained at a temperature between about 600° F. and about 1400° F. to convert a portion of said hydrocarbons to hydrogen, heating additional hydrocarbons by indirect heat exchange to a temperature between about 600° F. and about 1400° F., passing vaporous products of said contacting and of said indirect heat exchange together containing hydrocarbons in excess of about 15 percent methane equivalent through a succession of conversion zones, each of said conversion zones consisting essentially of a gas mixing zone and a catalytic reforming zone containing a bed of reforming catalyst, introducing an oxygen-nitrogen mixture into each of said gas mixing zones, injecting mixed reactants of each of said gas mixing zones into its respective catalytic reforming zone at a rate sufficient to preclude partial combustion outside of the bed of reforming catalyst, maintaining each of said catalytic reforming zones at a maximum temperature between about 2000° F. and about 2800° F. and a minimum temperature between about 1100° F. and about 2000° F. by controlling the amount of oxygen-nitrogen mixture introduced into each of said gas mixing zones and the volume of reforming catalyst in each of said beds of reforming catalyst, controlling the proportion of nitrogen present in said oxygen-nitrogen mixture so as to provide only enough nitrogen as required by subsequent ammonia synthesis, thereby converting substantially all of said hydrocarbons to hydrogen and converting a substantial portion of said hydrocarbons to hydrogen in each of said conversion zones and producing a gas useful, without further addition of nitrogen, in the production of ammonia synthesis gas.

9. A multizone conversion process for the production of hydrogen by partial combustion and catalytic steam reforming of hydrocarbons which comprises passing a preheated mixture of steam and vaporous hydrocarbons through a succession of conversion zones, each of said conversion zones consisting essentially of a gas mixing zone and a catalytic reforming zone containing a bed of reforming catalyst, introducing oxygen into each of said gas mixing zones, injecting mixed reactants of each of said gas mixing zones into its respective catalytic reforming zone at a rate sufficient to preclude partial combustion outside of the bed of reforming catalyst, and maintaining each of said catalytic reforming zones at a maximum temperature between about 2000° F. and about 2800° F. and a minimum temperature between about 1100° F. and about 2000° F. by controlling the amount of oxygen introduced into each of said gas mixing zones and the volume of reforming catalyst in each of said beds of reforming catalyst, so as to convert a substantial portion of said hydrocarbons to hydrogen in each of said conversion zones.

References Cited by the Examiner
UNITED STATES PATENTS

| | | | |
|---|---|---|---|
| 1,736,065 | 11/1929 | Williams | 23—212 |
| 1,874,801 | 8/1932 | Porter | 252—376 |
| 1,957,743 | 5/1934 | Wietzel et al. | 23—212 X |
| 2,475,855 | 7/1949 | Peters | 23—288 |
| 2,579,672 | 12/1951 | Houston | 23—288 |
| 2,829,113 | 4/1958 | Barry et al. | 252—376 |

LEON ZITVER, *Primary Examiner.*

MAURICE A. BRINDISI, JULIUS GREENWALD,
*Examiners.*

UNITED STATES PATENT OFFICE
CERTIFICATE OF CORRECTION

Patent No. 3,278,452                      October 11, 1966

Donald A. Vorum

It is hereby certified that error appears in the above numbered patent requiring correction and that the said Letters Patent should read as corrected below.

Column 6, TABLE I, first column, line 2 thereof, for "$CH_2$" read -- $CH_4$ --.

Signed and sealed this 29th day of August 1967.

(SEAL)
Attest:

ERNEST W. SWIDER                      EDWARD J. BRENNER
Attesting Officer                       Commissioner of Patents